US010698365B2

(12) United States Patent
Shi (10) Patent No.: US 10,698,365 B2
(45) Date of Patent: Jun. 30, 2020

(54) METHOD AND SYSTEM FOR GENERATING COMPUTER-GENERATED HOLOGRAM

(71) Applicant: BOE Technology Group Co., Ltd., Beijing (CN)

(72) Inventor: Bingchuan Shi, Beijing (CN)

(73) Assignee: BOE TECHNOLOGY GROUP CO., LTD., Beijing (CN)

(\*) Notice: Subject to any disclaimer, the term of this patent is extended or adjusted under 35 U.S.C. 154(b) by 122 days.

(21) Appl. No.: 15/710,059

(22) Filed: Sep. 20, 2017

(65) Prior Publication Data

US 2018/0239305 A1 Aug. 23, 2018

(30) Foreign Application Priority Data

Feb. 23, 2017 (CN) .......................... 2017 1 0101337

(51) Int. Cl.
*G03H 1/08* (2006.01)
*G03H 1/04* (2006.01)

(52) U.S. Cl.
CPC ......... *G03H 1/0841* (2013.01); *G03H 1/0443* (2013.01); *G03H 1/0808* (2013.01); *G03H 2001/0454* (2013.01); *G03H 2210/30* (2013.01); *G03H 2210/44* (2013.01); *G03H 2210/441* (2013.01); *G03H 2240/51* (2013.01)

(58) Field of Classification Search
CPC ...... G03H 1/08; G03H 1/2294; G03H 1/0891; G03H 2210/30; G03H 2001/0858
USPC .......................................................... 359/9
See application file for complete search history.

(56) References Cited

U.S. PATENT DOCUMENTS 7,088,440 B2 * 8/2006 Buermann ............ G06F 3/0321
356/138
7,813,018 B2 * 10/2010 Klug ...................... G03H 1/20
359/23

(Continued)

FOREIGN PATENT DOCUMENTS

CN 103106686 A 5/2013
CN 103745055 A 4/2014

(Continued)

OTHER PUBLICATIONS

First Office Action, including Search Report, for Chinese Patent Application No. 201710101337.5, dated Oct. 9, 2019, 11 pages.

*Primary Examiner* — William R Alexander
*Assistant Examiner* — Tamara Y. Washington
(74) *Attorney, Agent, or Firm* — Westman, Champlin & Koehler, P.A.

(57) ABSTRACT

The present disclosure provides a method for calculating a light field distribution in the process of generating a computer-generated hologram, including: performing a three-dimensional modeling to an object for which a hologram is to be generated so as to obtain a three-dimensional model of the object; determining the luminous characteristics of each voxel of the three-dimensional model at various azimuth angles within a viewing angle range of the hologram to be formed; and calculating a light field distribution of the object light wave of each voxel on the holographic plane based on the luminous characteristics of each voxel at various azimuth angles within the viewing angle range of the hologram to be formed. The present disclosure also provides a method and a system for generating a computer-generated hologram.

14 Claims, 6 Drawing Sheets (56) References Cited

U.S. PATENT DOCUMENTS

| | | | | |
|---|---|---|---|---|
| 8,711,477 B2* | 4/2014 | Coleman | ................ | G02B 30/25 |
| | | | | 359/459 |
| 9,448,532 B2* | 9/2016 | Zschau | ................ | G03H 1/0808 |
| 2004/0075878 A1 | 4/2004 | Cameron et al. | | |
| 2014/0030895 A1* | 1/2014 | Menon | ..................... | G03H 1/08 |
| | | | | 438/708 |
| 2015/0369985 A1* | 12/2015 | Gruner-Nielsen | ........................... | |
| | | | | G02B 6/02314 |
| | | | | 359/15 |
| 2016/0004219 A1* | 1/2016 | Leister | ..................... | G02B 5/32 |
| | | | | 359/9 |
| 2018/0239305 A1* | 8/2018 | Shi | ....................... | G03H 1/0841 |
| 2018/0246468 A1* | 8/2018 | Chen | ........................ | G02B 5/32 |
| 2018/0267463 A1* | 9/2018 | Chen | ........................ | G03H 1/02 |
| 2018/0267468 A1* | 9/2018 | Chen | .................... | G03H 1/2294 |

FOREIGN PATENT DOCUMENTS

| | | |
|---|---|---|
| CN | 104198040 A | 12/2014 |
| CN | 104360590 A | 2/2015 |

* cited by examiner

METHOD AND SYSTEM FOR GENERATING COMPUTER-GENERATED HOLOGRAM

CROSS-REFERENCE TO RELATED APPLICATION

This application claims the benefit of Chinese Patent Application No. 201710101337.5 filed on Feb. 23, 2017 in the State Intellectual Property Office of China, the whole disclosure of which is incorporated herein by reference.

TECHNICAL FIELD

The present disclosure relates to the field of holographic images, and in particular to a method and a system for generating a computer-generated hologram.

DESCRIPTION OF THE RELATED ART

Holographic display technology is divided into a traditional optical holography and a computer-generated holography in which a digital computer is used to simulate, calculate, and process a variety of optical processes. Among them, the computer-generated holography is a current research trend because of low noise, good reproducibility, capable of obtaining a hologram of a virtual object, and other notable features.

A generating and reproduction process of the computer-generated hologram in the related art is mainly divided into the following five steps: first, sampling in which the values of discrete samples on an object or a wave surface are obtained; second, calculating in which a light field distribution of the object light wave on the holographic plane is calculated; third, encoding in which the complex amplitude distribution of the light wave on the holographic plane is encoded into a transmittance variation of the hologram; fourth, mapping in which a figure is plotted with the transmittance variation of the hologram under the control of a computer, wherein if the resolution of a drawing device is not enough, a larger graph is plotted and then is shrunk into a version of a hologram to be used; fifth, reproducing, which step is the same as the reproduction of an optical hologram.

Under the condition that observing a real object, what we observe is generally reflected light on the surface of the object, most of the light reflection of the surface material presents a significant anisotropy. In this way, in the process of the actual observation at different viewing angles, the brightness of the surface points will present the corresponding changes corresponding to the material. However, in the current computation-generated holography, the three-dimensional model of the solid or virtual object is sampled into a plurality of discretized voxels. Only the surface luminance information is preserved and the texture detail information of the model surface is discarded. That is, a voxel is only a point with certain brightness. In this way, in the process of generating a computer-generated hologram, anisotropy of the luminous intensity of each voxel of the object is not presented. Therefore, under the condition that the reproduced holographic image is viewed from different angles, the brightness of each voxel is almost unchanged, which is of a significant difference from the actually observed object.

SUMMARY

According to an aspect of the present invention, there is provided a method for calculating a light field distribution in the process of generating a computer-generated hologram, including:

performing a three-dimensional modeling to an object for which a hologram is to be generated so as to obtain a three-dimensional model of the object;

determining the luminous characteristics of each voxel of the three-dimensional model at various azimuth angles within a viewing angle range of the hologram to be formed; and calculating a light field distribution of an object light wave of each voxel on the holographic plane based on the luminous characteristics of each voxel at various azimuth angles within the viewing angle range of the hologram to be formed.

According to some embodiments, based on the established three-dimensional model, the luminous characteristics of each voxel of the three-dimensional model at various azimuth angles within the viewing angle range of the hologram to be formed is calculated with a bidirectional reflection distribution function (BRDF).

According to some embodiments, the luminous characteristics of each voxel of the three-dimensional model of the object at various azimuth angles within the viewing angle range of the hologram to be formed is calculated with a mathematical model under the condition that the object is made of a material whose physical mechanism of surface radiation is known.

According to some embodiments, the luminous characteristics of each voxel of the three-dimensional model of the object at various azimuth angles within the viewing angle range of the hologram to be formed is determined by an actual measurement under the condition that the object is a solid three-dimensional model.

According to some embodiments, the luminous characteristics of a voxel of the three-dimensional model at various azimuth angles within a viewing angle range of the hologram to be formed is calculated according to the magnitude of the complex amplitude of the light waves radiated from the voxel and the azimuth angle of the voxel within the viewing angle range of the hologram to be formed.

According to some embodiments, the light field distribution of the object light wave of each voxel on the holographic plane is represented by the complex amplitude of the object light wave of each voxel on the holographic plane, and the step of calculating a light field distribution of the object light wave of each voxel on the holographic plane based on the luminous characteristics of each voxel at various azimuth angles within the viewing angle range of the hologram to be formed comprises:

calculating the result of the complex amplitude of the object light wave of each voxel on the holographic plane weighted with the luminous characteristics of the corresponding voxel at various azimuth angles within the viewing angle range of the hologram to be formed.

According to some embodiments, the light field distribution of the object light wave of a voxel on the holographic plane is calculated according to a formula as follow $$U(AP) = L(\theta) * \frac{a}{r} * \exp(ikr)$$

where U(AP) represents the complex amplitude of the object light wave of the voxel A at the point P on the holographic plane, θ represents the azimuth angle of the voxel A within the viewing angle range of the hologram to be formed, and L(θ) represents the luminous characteristics of the voxel A at the azimuth angle θ, a represents the initial amplitude of the object light wave of the voxel A, r represents the distance from the voxel A to the point P, and k represents the wave vector.

According to some embodiments, the luminous characteristics of a voxel of the three-dimensional model at various azimuth angles within a viewing angle range of the hologram to be formed is calculated according to a formula as follow $$L(\theta) = L_0 * \frac{BRDF(\theta + \alpha)}{BRDF(0)}$$

where θ represents the azimuth angle of the voxel within the viewing angle range of the hologram to be Ruined, α represents the azimuth angle of a light source within the viewing angle range of the hologram to be formed, and L(θ) represents the luminous characteristics of the voxel at the azimuth angle θ, $L_0$ represents the radiation intensity in the direction of the light source, BRDF(0) and BRDF(θ+α) represent the values in the reflection directions along the 0° and (θ+α)° calculated with the BRDF function.

According to some embodiments, the luminous characteristics of a voxel of the three-dimensional model of the object at various azimuth angles within the viewing angle range of the hologram to be formed is calculated according to the following formula under the condition that the object is made of a material whose physical mechanism of surface radiation is known $$L(\theta) = L_0 * \sqrt{\cos(\theta + \alpha)}$$

where θ represents the azimuth angle of the voxel within the viewing angle range of the hologram to be formed, α represents the azimuth angle of a light source within the viewing angle range of the hologram to be formed, and L(θ) represents the luminescence characteristic of the voxel at the azimuth angle θ, and $L_0$ represents the radiation intensity in the direction of the light source.

According to some embodiments, the luminous characteristics of a voxel of the three-dimensional model of the object at various azimuth angles within the viewing angle range of the hologram to be formed is calculated according to the following formula by an actual measurement under the condition that the object is a solid three-dimensional model:

$$L(\theta) = \begin{cases} l_1, & \theta_0 < \theta < \theta_1 \\ l_2, & \theta_1 < \theta < \theta_2 \\ \ldots \\ l_n, & \theta_{n-1} < \theta < \theta_n \end{cases}$$

where θ represents the azimuth angle of the voxel within the viewing angle range of the hologram to be formed, L(θ) represents the luminous characteristic of the voxel at the azimuth angle θ, $\theta_0, \theta_1, \ldots \theta_{n-1}, \theta_n$ represent corresponding azimuth angles in each actual measurement, respectively, and $l_1, l_2 \ldots l_n$ represent the luminous characteristic values obtained in each actual measurement, respectively.

According to another aspect of the present invention, there is provided a method for generating a computer-generated hologram, comprising:

a calculating step of calculating a light field distribution of an object light wave of each voxel of a three-dimensional model on the holographic plane formed by a plurality of pixels of a spatial light modulator according to the method according to any one of the above embodiments;

an encoding step of encoding the calculated light field distribution on the holographic plane into a transmittance variation of the hologram; and a mapping step of plotting a hologram with the transmittance variation of the hologram under the control of the computer.

According to another aspect of the present invention, there is provided a system for generating a computer-generated hologram comprising:

a modeling module configured to perform a three-dimensional modeling to an object for which a hologram is to be generated to obtain a three-dimensional model of the object;

a luminous characteristic determination module configured to determine the luminous characteristics of each voxel of the three-dimensional model at various azimuth angles within a viewing angle range of the hologram to be formed; and a light field distribution calculation module configured to calculate a light field distribution of an object light wave of each voxel on the holographic plane based on the luminous characteristics of each voxel at various azimuth angles within the viewing angle range of the hologram to be formed.

According to some embodiments, the luminous characteristic determination module is specifically configured to, based on the established three-dimensional model, calculate the luminous characteristics of each voxel of the three-dimensional model at various azimuth angles within the viewing angle range of the hologram to be formed with a bidirectional reflection distribution function (BRDF).

According to some embodiments, the luminous characteristic determination module is specifically configured to calculate the luminous characteristics of each voxel of the three-dimensional model of the object at various azimuth angles within the viewing angle range of the hologram to be formed with a mathematical model under the condition that the object is made of a material whose physical mechanism of surface radiation is known.

According to some embodiments, the luminous characteristic determination module is specifically configured to determine the luminous characteristics of each voxel of the three-dimensional model of the object at various azimuth angles within the viewing angle range of the hologram to be formed by an actual measurement under the condition that the object is a solid three-dimensional model.

According to some embodiments, the luminous characteristic determination module is specifically configured to calculate the luminous characteristics of a voxel of the three-dimensional model at various azimuth angles within a viewing angle range of the hologram to be formed according to the magnitude of the complex amplitude of the light waves radiated from the voxel and the azimuth angle of the voxel within the viewing angle range of the hologram to be formed.

According to some embodiments, the light field distribution calculation module is specifically configured to calculate the complex amplitude of the object light wave of each voxel on the holographic plane weighted with the luminous characteristics of the corresponding voxel at various azimuth angles within the viewing angle range of the hologram to be formed so as to obtain a light field distribution of the object light wave of each voxel on the holographic plane.

According to some embodiments, the luminous characteristic determination module is specifically configured to calculate the luminous characteristics of a voxel of the three-dimensional model at various azimuth angles within a viewing angle range of the hologram to be formed according to a formula as follow $$L(\theta) = L_0 * \frac{BRDF(\theta + \alpha)}{BRDF(0)}$$

where θ represents the azimuth angle of the voxel within the viewing angle range of the hologram to be formed, α represents the azimuth angle of a light source within the viewing angle range of the hologram to be formed, and L(θ) represents the luminous characteristics of the voxel at the azimuth angle θ, $L_0$ represents the radiation intensity in the direction of the light source, BRDF(0) and BRDF(θ+α) represent the values in the reflection directions along the 0° and (θ+α)° calculated with the BRDF function.

According to some embodiments, the luminous characteristic determination module is specifically configured to calculate the luminous characteristics of a voxel of the three-dimensional model of the object at various azimuth angles within the viewing angle range of the hologram to be formed according to the following formula under the condition that the object is made of a material whose physical mechanism of surface radiation is known $$L(\theta) = L_0 * \sqrt{\cos(\theta + \alpha)}$$

where θ represents the azimuth angle of the voxel within the viewing angle range of the hologram to be formed, α represents the azimuth angle of the light source within the viewing angle range of the hologram to be formed, and L(θ) represents the luminescence characteristic of the voxel at the azimuth angle θ, and $L_0$ represents the radiation intensity in the direction of the light source.

According to some embodiments, the luminous characteristic determination module is specifically configured to calculate the luminous characteristics of a voxel of the three-dimensional model of the object at various azimuth angles within the viewing angle range of the hologram to be formed according to the following formula by an actual measurement under the condition that the object is a solid three-dimensional model:

$$L(\theta) = \begin{cases} l_1, & \theta_0 < \theta < \theta_1 \\ l_2, & \theta_1 < \theta < \theta_2 \\ \ldots \\ l_n, & \theta_{n-1} < \theta < \theta_n \end{cases}$$

where θ represents the azimuth angle of the voxel within the viewing angle range of the hologram to be formed, L(θ) represents the luminous characteristic of the voxel at the azimuth angle θ, $\theta_0, \theta_1, \ldots \theta_{n-1}, \theta_n$ represents corresponding azimuth angles in each actual measurement, respectively, and $l_1, l_2, \ldots l_n$ represent the luminous characteristic values obtained in each actual measurement, respectively.

According to some embodiments, the system further comprises an encoding module configured to encode the calculated light field distribution on the holographic plane into a transmittance variation of the hologram; and a, mapping module configured to plot a hologram with the transmittance variation of the hologram.

According to another aspect of the present invention, there is provided an electronic device comprising a processor and a memory, wherein the memory is stored with instructions that cause the processor to perform the method according to above embodiments under the condition that the instructions are executed.

BRIEF DESCRIPTION OF THE DRAWINGS

Other objects and advantages of the present disclosure will become apparent from the following description of the present disclosure with reference to the Figures, and may give a comprehensive understanding of the present disclosure.

DETAILED DESCRIPTION OF PREFERRED EMBODIMENTS

The technical solution of the present disclosure will be described in further detail with reference to the following embodiments, taken in conjunction with the accompanying drawings. In the specification, the same or similar reference numerals indicate the same or similar parts. The description of the embodiments of the present disclosure with reference to the accompanying drawings is intended to explain the general inventive concept of the present disclosure and should not be construed as a limitation on the present disclosure.

In addition, in the following detailed description, numerous specific details are set forth in order to facilitate the explanation to provide a thorough understanding of the present disclosure embodiments. It will be apparent, however, that one or more embodiments may also be practiced without these specific details. In other instances, well-known structures and devices are illustrated by way of illustration to simplify the drawings.

According to an embodiment of the present disclosure, the surface of the digital three-dimensional model is divided or sampled into a series of face elements during the generation of the computer-generated hologram, and each face element is then abstracted as a voxel. In the process of generating the computer-generated hologram, it is firstly needed to calculate the light field distribution of each voxel on the holographic plane. The term "light field distribution"

in this context means the distribution of light waves in space at a time, and in particular, the distribution of the light waves of the voxels of the object on the holographic plane at a certain time. In one example, the light field distribution of the voxel on the holographic plane can be represented by the complex amplitude of the light waves reaching the holographic plane. According to an example of the present disclosure, each voxel generates a primitive holographic complex amplitude function based on the relative position to the holographic plane, the surface brightness and the illumination wavelength. The superposition of all the holographic complex amplitude functions generated from all voxels will constitute a complete holographic complex amplitude function of the three-dimensional model.

Figure 1:
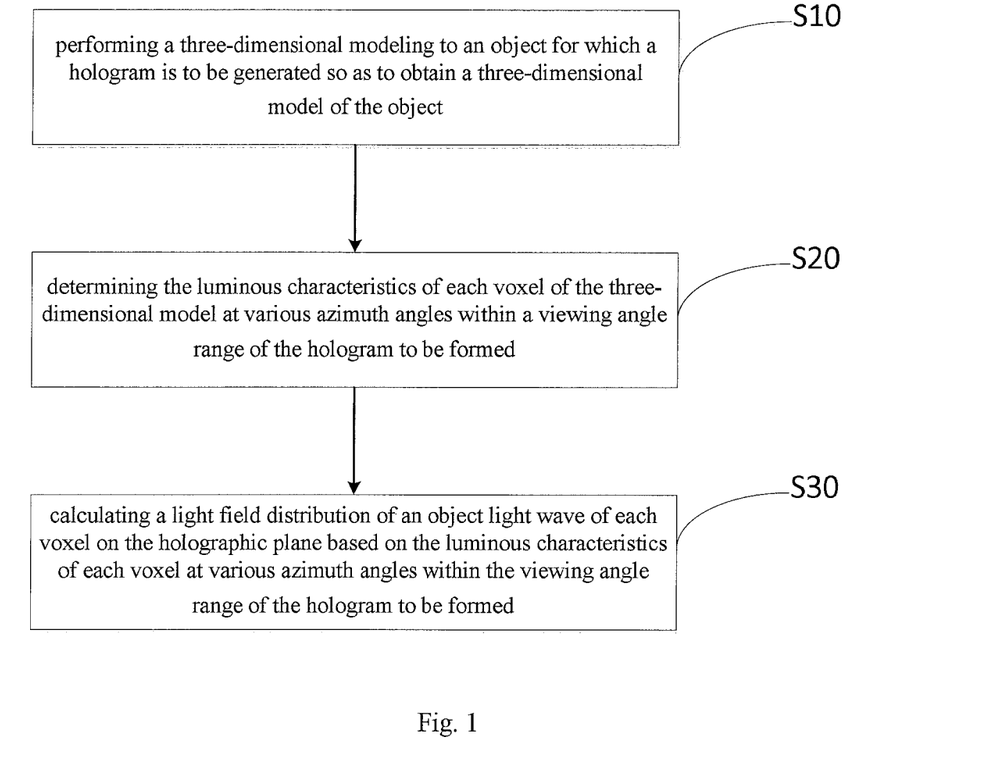
FIG. 1 is a flow diagram of a method for calculating a light field distribution in the process of generating a computer-generated hologram according to an embodiment of the present disclosure.

FIG. 1 is a flow diagram of a method for calculating a light field distribution in the process of generating a computer-generated hologram according to an embodiment of the present disclosure.

In step S10, performing a three-dimensional modeling to an object for which a hologram is to be generated so as to obtain a three-dimensional model of the object. Specifically, a solid three-dimensional object is modeled by a known three-dimensional modeling method (for example, three-dimensional scanning) to obtain its digital three-dimensional model, under the condition that the object for which a hologram is to be generated is a solid three-dimensional object. A virtual three-dimensional object itself usually has a corresponding digital three-dimensional model according to the computer graphics theory under the condition that the object for which a hologram is to be generated is a virtual three-dimensional object (i.e., a digital three-dimensional object).

In step S20, determining the luminous characteristics of each voxel of the three-dimensional model at various azimuth angles within a viewing angle range of the hologram to be formed. Specifically, the surface of the digital three-dimensional model established in step S10 is divided into a series of face elements each of which is sampled as a voxel and then the luminous characteristics of each voxel of the three-dimensional model at each azimuth angle within the viewing angle range of the hologram to be formed is determined. In one example, the luminous characteristics of a voxel at each azimuthal angle within the viewing angle range of the hologram to be formed may be calculated according to the magnitude of the complex amplitude of the light waves radiated from the voxel and the azimuth angle of the voxel within the viewing angle range of the hologram to be formed. The specific method for determining the luminous characteristics will be described in more detail below.

In step S30, calculating a light field distribution of an object light wave of each voxel on the holographic plane based on the luminous characteristics of each voxel at various azimuth angles within the viewing angle range of the hologram to be formed. Specifically, based on the luminous characteristics of each voxel at each azimuth angle within the viewing angle range of the hologram to be formed calculated in step S20, the light field distribution of the object light waves of each voxel on the holographic plane is calculated. A combination of the light field distributions of the object light waves of each voxel on the holographic plane forms the overall light field distribution of the object on the holographic plane.

In the following, a method for determining the luminous characteristics of a voxel at various azimuth angles within the viewing angle range of the hologram to be formed according to the present embodiment will be described in detail.

Figure 2:
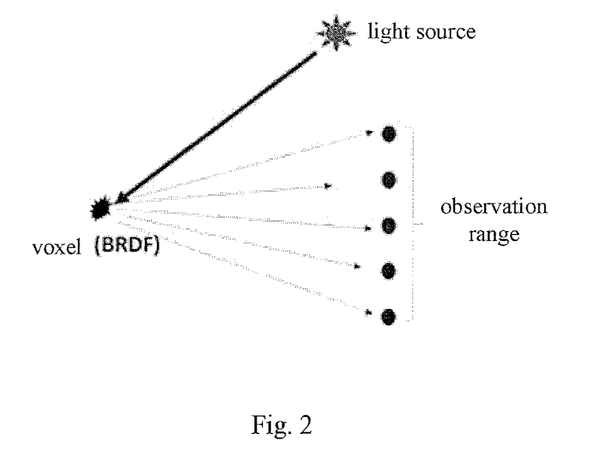
FIG. 2 is a schematic view showing multi-directional radiations of a voxel in a multi-viewpoint situation.

According to an embodiment of the present disclosure, as shown in FIG. 2, the luminous characteristics of each voxel of the three-dimensional model at various azimuth angles within a viewing angle range of the hologram to be formed is calculated with a bidirectional Reflectance Distribution Function (BRDF) based on the established three-dimensional model.

The process that people observe a surface is actually that the ambient light is irradiated onto the surface, and then the surface reflects a portion of the light into the human eye. The bidirectional reflection distribution function BRDF is used to describe the relationship between incident light and reflected light of the surface. Specifically, the bidirectional reflection distribution function BRDF is used to define how the irradiance in a given incidence direction affects radiance in a given exit direction. In general, it describes how the incident light is distributed in each exit direction after it is reflected by a certain surface, which can be ideal specular reflection, diffuse reflection, isotropic or anisotropic reflection.

Figure 3:
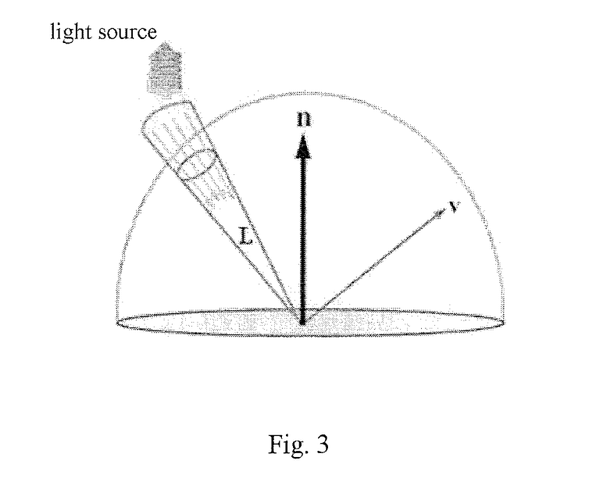
FIG. 3 is a schematic view showing incident and reflected light on the object surface.

For example, as shown in FIG. 3, L represents the direction of the incident light, v represents the direction of the reflected light (corresponding to the viewing direction), and n represents the normal direction of the surface. For an incident light in one direction, the surface will reflect the light to an upper hemisphere on the surface in various directions, the reflected proportions are different in different directions. We use BRDF to represent a proportional relationship between a reflected light in a given direction and an incident light, the BRDF can be defined as:

$$f(l, v) = \frac{dL_o(v)}{dE(l)}$$

where f represents the BRDF function, l represents the direction of the incident light, v represents the observation direction, $L_o(v)$ represents the radiance of the reflected light reflected in the direction v by the surface, $dL_o(v)$ represents the differential radiance of the reflected light reflected in the direction v by the surface, and dE(l) represents the differential radiance on the surface in the direction of the incident light l, where the irradiance received by the surface is E, which comes from the contribution of the incident rays in all directions of the upper hemisphere, and the differential irradiance dE(l) represents specifically the incident light from the direction l.

At present, up to 100 kinds of BRDF models are established, which can be substantially divided into three categories: empirical and statistical models, physical models and semi-empirical models. Among them, the physical model mainly comprises radiation transmission model, geometric optical model, mixed model and computer simulation model 4 categories. Commonly used physical models include Lambert, Phong, Cook-Torrance, Ward, Oren-Nayar and other models.

Figure 4:
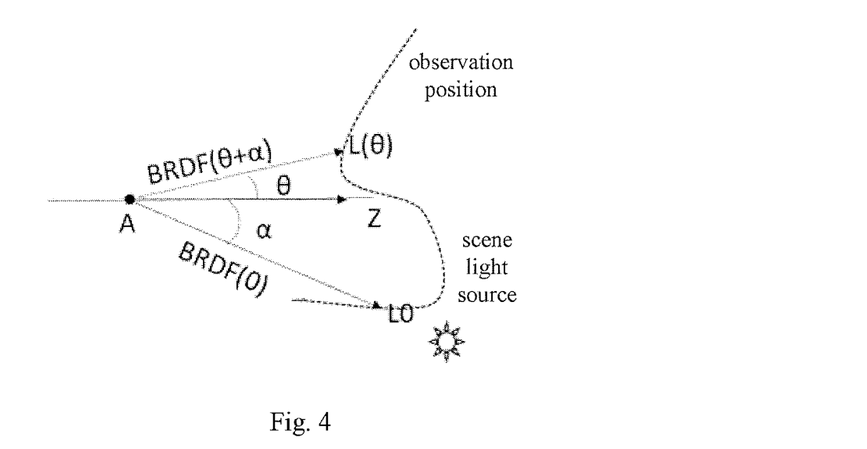
FIG. 4 is a schematic view of calculating the luminous characteristics according to the bidirectional reflection distribution function.

According to the BRDF theory described above, in FIG. 4, A represents voxels, AZ represents the horizontal direction, and the luminous characteristics of a voxel at a azimuth angle θ within the viewing angle range of the hologram to be formed may be calculated according to the following formula:

$$L(\theta) = L_0 * \frac{BRDF(\theta + \alpha)}{BRDF(0)}$$

wherein θ represents the azimuth angle of the voxel in the range of the viewing angle of the hologram to be formed, α represents the azimuth angle of the light source in the range of the viewing angle of the hologram to be formed, L(θ) represents the luminous characteristics of the voxel at the azimuth angle θ, BRDF(0) and BRDF(θ+α) represent the values in the reflection direction of 0° and (θ+α)° (i.e., the direction of the light source and the direction of observation in FIG. 4) which are calculated with the BRDF function, respectively.

Figure 5:
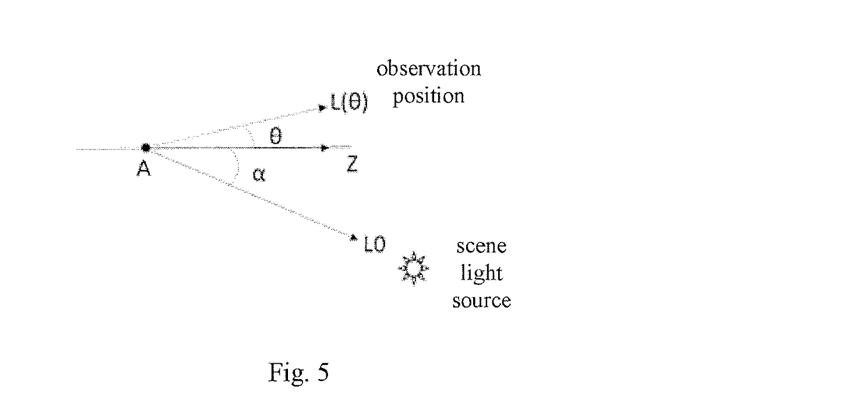
FIG. 5 is a schematic view of calculating the luminous characteristics according to the Lambertian radiator principle.

According to another embodiment of the present disclosure, as shown in FIG. 5, the luminous characteristics of each voxel of the three-dimensional model of the object at various azimuth angles within the viewing angle range of the hologram to be formed is calculated with a mathematical model under the condition that the object is made of a material whose physical mechanism of surface radiation is known. For the physical mechanism of the surface radiation of a material, it may be generally described qualitatively as follows: after the surface of the object is irradiated by light, some atoms or molecules of the object are transformed from an "excited state" to a "low energy state", and then the energy is emitted in the form of electromagnetic radiation. At present, the physical mechanism of the surface radiation of some materials is known, for example, the Lambertian radiator, the radiation intensity of which can be calculated using a formulated mathematical model. Thus, under the condition that the object is made of these materials of which physical mechanism of the surface radiation is known, for example, under the condition that the object is a Lambertian radiator, the radiation intensity varying with the angle θ between the viewing direction and the normal of the surface source follows the cosine law, the luminous characteristics of a voxel at each azimuth angle within the viewing angle range of the hologram to be formed can be then calculated according to the following formula:

$$L(\theta) = L_0 * \sqrt{\cos(\theta + \alpha)}$$

where θ represents the azimuth angle of the voxel within the viewing angle range of the hologram to be formed, α represents the azimuth angle of the light source within the viewing angle range of the hologram to be formed, L(θ) represents the luminous characteristics of the voxel at the azimuth angle θ, and $L_0$ represents the radiation intensity in the direction of the light source.

According to still another embodiment of the present disclosure, the luminous characteristics of a voxel of the three-dimensional model of the object at various azimuth angles within the viewing angle range of the hologram to be formed is determined by an actual measurement under the condition that the object is a solid three-dimensional model. Specifically, under the condition that the object is a solid three-dimensional model, the luminous characteristics of a voxel at each azimuth angle within the viewing angle range of the hologram to be formed is calculated by the actual measurement according to the following formula:

$$L(\theta) = \begin{cases} l_1, \theta_0 < \theta < \theta_1 \\ l_2, \theta_1 < \theta < \theta_2 \\ \ldots \\ l_n, \theta_{n-1} < \theta < \theta_n \end{cases}$$

where θ represents the azimuth angle of the voxel within the viewing angle range of the hologram to be formed, L(θ) represents the luminous characteristic of the voxel at the azimuth angle θ, $\theta_0, \theta_1, \ldots \theta_{n-1}, \theta_n$ represent the corresponding azimuth angles in each actual measurement, respectively, and $l_1, l_2, \ldots l_n$ represent the luminous characteristic values obtained in each actual measurement, respectively.

The method for calculating the luminous characteristics of the voxels at the azimuth angle θ is described in detail in the above, and the light field distribution of the object light waves of each voxel on the holographic plane can be calculated based on the luminous characteristics of each voxel at the azimuth angle θ, so that the brightness of each point on the surface of the object exhibits a change corresponding to the material at different viewing azimuths.

According to an embodiment, the light field distribution of the object light wave of each voxel on the holographic plane is represented by the complex amplitude of the object light wave of each voxel on the holographic plane. Furthermore, in step S30, the step of calculating a light field distribution of the object light wave of each voxel on the holographic plane based on the luminous characteristics of each voxel at various azimuth angles within the viewing angle range of the hologram to be formed comprises: calculating the result of the complex amplitude of the object light wave of each voxel on the holographic plane weighted with the luminous characteristics of the corresponding voxel at various azimuth angles within the viewing angle range of the hologram to be formed. It will be understood by those skilled in the art that the "weight" in the mathematical sense generally means "factor", and "weighted" generally means multiplication by a factor.

Figure 6:
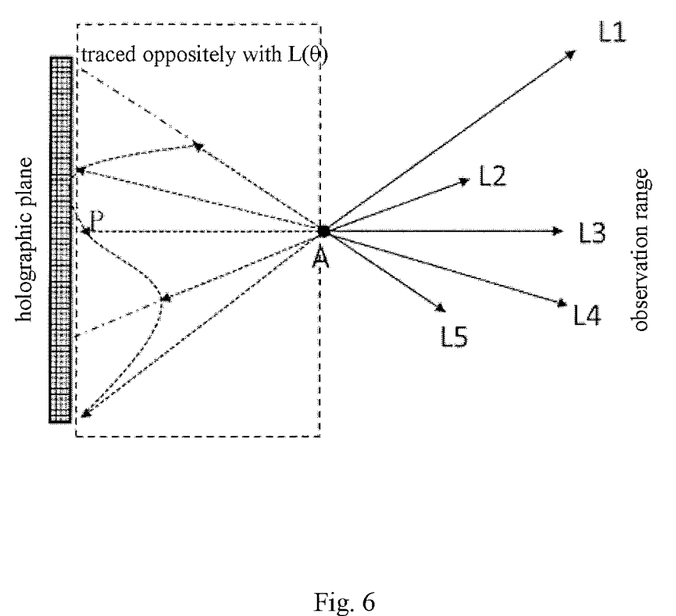
FIG. 6 is a schematic view showing the calculation of the light field distribution based on the luminous characteristics of the voxel.

Specifically, as shown in FIG. 6, the light emitted from point A is traced oppositely to the position P on the holographic plane to obtain the complex amplitude distribution of the light wave. In the example shown in FIG. 6, the light field distribution of the object light wave of the voxel A on the holographic plane is calculated according to a formula as follow:

$$U(AP) = L(\theta) * \frac{a}{r} * \exp(ikr)$$

where U(AP) represents the complex amplitude of the object light wave of the voxel A at the point P on the holographic plane, θ represents the azimuth angle of the voxel A within the viewing angle range of the hologram to be formed, and L(θ) represents the luminous characteristics of the voxel A at the azimuth angle θ, α represents the initial amplitude of the object light wave of the voxel A, r represents the distance from the voxel A to the point P, and k represents the wave vector.

Figure 7:
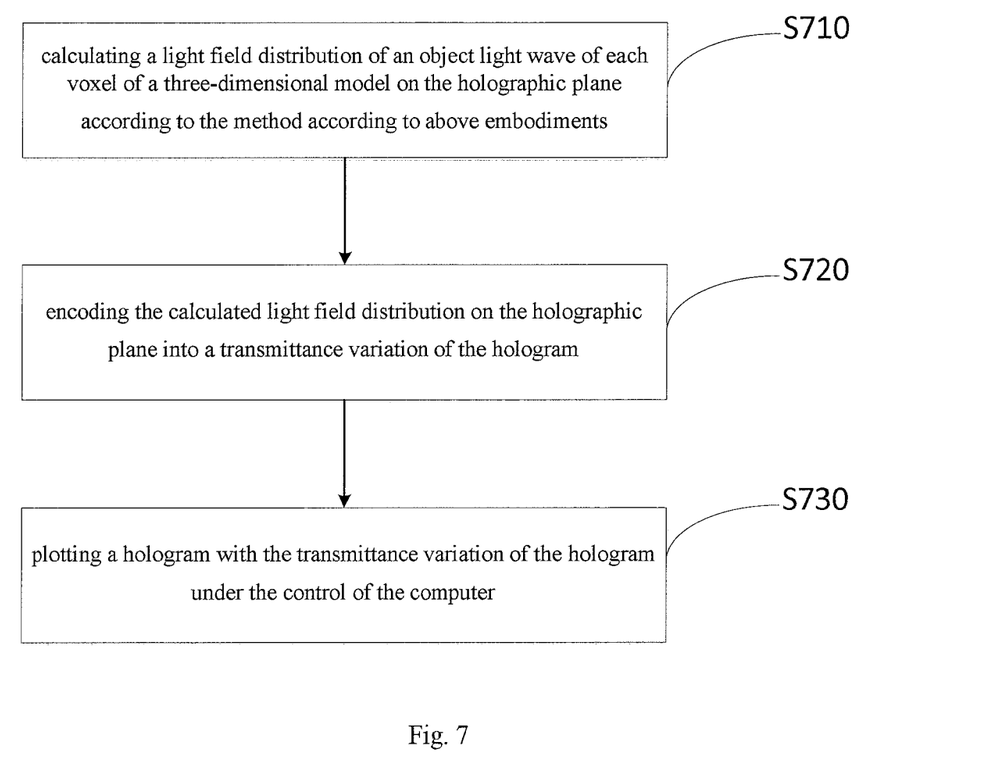
FIG. 7 is a flow diagram of a method for generating a computer-generated hologram according to an embodiment of the present disclosure.

According to an embodiment of the present disclosure, as shown in FIG. 7, there is provided a method for generating a computer-generated hologram, comprising the following steps:

Step S710: calculating a light field distribution of an object light wave of each voxel of a three-dimensional model on the holographic plane according to the method according to above embodiments;

Step S720: encoding the calculated light field distribution on the holographic plane into a transmittance variation of the hologram; and Step S730: plotting a hologram with the transmittance variation of the hologram under the control of the computer.

In one example, the holographic plane may be formed by a spatial light modulator, i.e., the computer-generated hologram is generated in the spatial light modulator. The spatial light modulator is a spatial light modulator manufactured on basis of the electrochemical birefringence effect of the liquid crystal molecules. Its controlled cells are independent pixel units which are spatially arranged in a one-dimensional or two-dimensional array. Each unit may independently receive control signals such as optical signals or electrical signals, and may modulate the input light at pixel level, changing the wavefront of the light wave flexibly.

Figure 8:
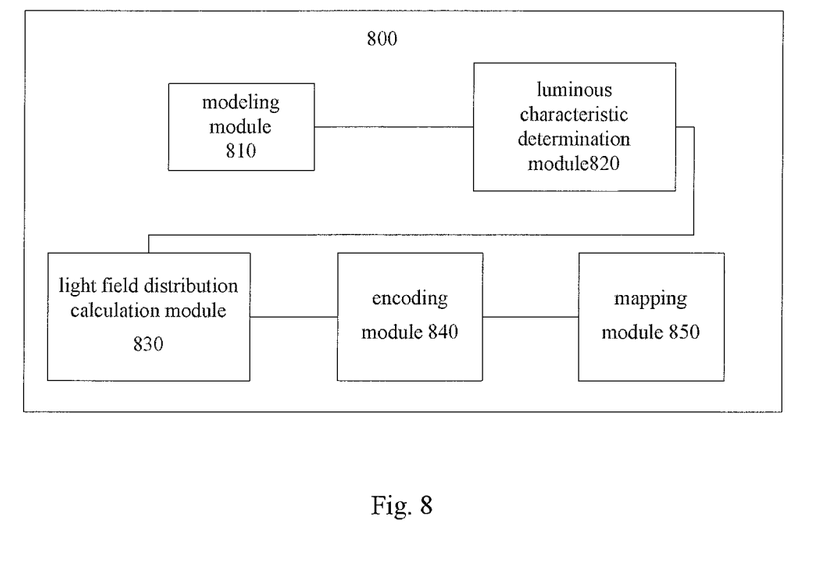
FIG. 8 is a block diagram of a system for generating a computer-generated hologram according to an embodiment of the present disclosure.

According to another embodiment of the present disclosure, as shown in FIG. 8, there is further provided a system 800 for generating a computer-generated hologram comprising:

a modeling module 810 configured to perform three-dimensional modeling to an object for which a hologram is to be generated to obtain a three-dimensional model of the object;

a luminous characteristic determination module 820 configured to determine the luminous characteristics of each voxel of the three-dimensional model at various azimuth angles within a viewing angle range of the hologram to be formed; and a light field distribution calculation module 830 configured to calculate a light field distribution of an object light wave of each voxel on the holographic plane based on the luminous characteristics of each voxel at various azimuth angles within the viewing angle range of the hologram to be formed.

According to an embodiment of the present disclosure, the luminous characteristic determination module 820 is specifically configured to, based on the established three-dimensional model, calculate the luminous characteristics of each voxel of the three-dimensional model at various azimuth angles within the viewing angle range of the hologram to be formed with a bidirectional reflection distribution function (BRDF); or calculate the luminous characteristics of each voxel of the three-dimensional model of the object at various azimuth angles within the viewing angle range of the hologram to be formed with a mathematical model under the condition that the object is made of a material whose physical mechanism of surface radiation is known; or determine the luminous characteristics of each voxel of the three-dimensional model of the object at various azimuth angles within the viewing angle range of the hologram to be formed by an actual measurement under the condition that the object is a solid three-dimensional model.

In an embodiment, the luminous characteristic determination module 820 is specifically configured to calculate the luminous characteristics of a voxel at various azimuth angles within a viewing angle range of the hologram to be formed according to the magnitude of the complex amplitude of the light waves radiated from the voxel and the azimuth angle of the voxel within the viewing angle range of the hologram to be formed.

In an embodiment, the light field distribution calculation module 830 is specifically configured to calculate the complex amplitude of the object light wave of each voxel on the holographic plane weighted with the luminous characteristics of the corresponding voxel at various azimuth angles within the viewing angle range of the hologram to be formed so as to obtain a light filed distribution of the object light wave of each voxel on the holographic plane.

In an embodiment, the luminous characteristic determination module 820 is specifically configured to calculate the luminous characteristics of a voxel at various azimuth angles within a viewing angle range of the hologram to be formed according to a formula as follow $$L(\theta) = L_0 * \frac{BRDF(\theta + \alpha)}{BRDF(0)}$$

where $\theta$ represents the azimuth angle of the voxel within the viewing angle range of the hologram to be formed, $\alpha$ represents the azimuth angle of the light source within the viewing angle range of the hologram to be formed, and $L(\theta)$ represents the luminous characteristics of the voxel at the azimuth angle $\theta$, $L_0$ represents the radiation intensity in the direction of the light source, $BRDF(0)$ and $BRDF(\theta+\alpha)$ represent the values in the reflection directions along the $0°$ and $(\theta+\alpha)°$ calculated with the BRDF function.

In an embodiment, the luminous characteristic determination module 820 is specifically configured to calculate the luminous characteristics of a voxel at various azimuth angles within the viewing angle range of the hologram to be formed according to a following formula under the condition that the object is made of a material whose physical mechanism of surface radiation is known $$L(\theta) = L_0 * \sqrt{\cos(\theta + \alpha)}$$

where $\theta$ represents the azimuth angle of the voxel within the viewing angle range of the hologram to be formed, $\alpha$ represents the azimuth angle of a light source within the viewing angle range of the hologram to be formed, and $L(\theta)$ represents the luminescence characteristic of the voxel at the azimuth angle $\theta$, and $L_0$ represents the radiation intensity in the direction of the light source.

In an embodiment, the luminous characteristic determination module 820 is specifically configured to calculate the luminous characteristics of each voxel at various azimuth angles within the viewing angle range of the hologram to be formed according to the following formula by an actual measurement under the condition that the object is a solid three-dimensional model:

$$L(\theta) = \begin{cases} l_1, \theta_0 < \theta < \theta_1 \\ l_2, \theta_1 < \theta < \theta_2 \\ \ldots \\ l_n, \theta_{n-1} < \theta < \theta_n \end{cases}$$

where $\theta$ represents the azimuth angle of the voxel within the viewing angle range of the hologram to be formed, $L(\theta)$ represents the luminous characteristic of the voxel at the azimuth angle $\theta$, $\theta_0, \theta_1, \ldots \theta_{n-1}, \theta_n$ represent the corresponding azimuth angles in each actual measurement, respectively, and $l_1, l_2, \ldots l_n$ represent the luminous characteristic values obtained in each actual measurement, respectively.

According to another embodiment of the present disclosure, as shown in FIG. 8, the system 800 further comprises a encoding module 840 configured to encode the calculated light field distribution on the holographic plane into a transmittance variation of the hologram; and a mapping module 850 configured to plot a hologram with the transmittance variation of the hologram. In an example, the encoding module 840 and the mapping module 850 are formed by a spatial light modulator.

Figure 9:
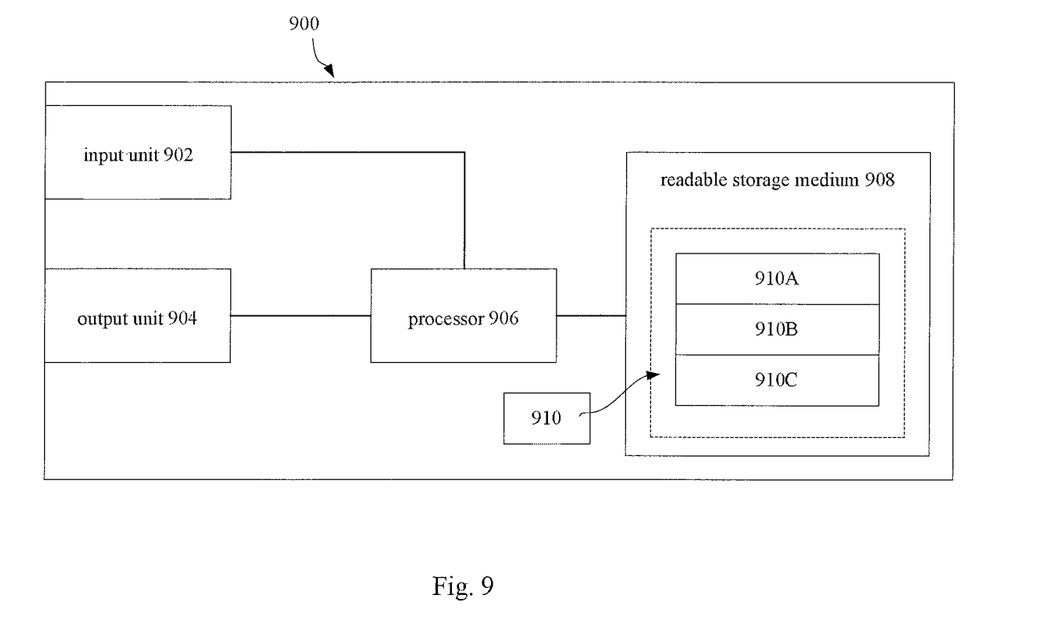
FIG. 9 is a block diagram of an electronic device for generating a computer-generated hologram according to an embodiment of the present disclosure.

FIG. 9 is a block diagram illustrating an exemplary hardware arrangement 900 of the system (or device) 800 shown in FIG. 8 according to an embodiment of the present disclosure. The hardware arrangement 900 includes a processor 906 (e.g., a central processing unit (CPU), a microprocessor (MCU), a digital signal processor (DSP), an field programmable logic array (FPGA), a specific application integrated circuit (ASIC), a Graphics Processor (GPU), etc.). The processor 906 may be a single processing unit or a plurality of processing units for performing different steps of the methods described herein. The arrangement 900 may also include an input unit 902 for receiving signals from other entities, and an output unit 904 for providing signals to other entities. The input unit 902 and the output unit 904 may be arranged as a single entity or separate entities. The input unit 902 may include a keyboard, a mouse, a remote control, a touch screen, or a communication interface interconnected with other entities. The input device is configured to receive instructions or information from an external computer, an external device, or from a user, or the like. The output unit 904 may include a display, a projector, a communication interface interconnected with other entities and the like, so as to display or transmit the operation data or the operation result to an external computer, an external device, or a user.

Further, the arrangement 900 may comprise at least one readable storage medium 908 in form of a non-volatile or volatile memory, for example, an electrically erasable programmable read only memory (EEPROM), a flash memory, and/or a hard drive. The readable storage medium 908 includes a computer program 910 that includes code/computer readable instructions that cause the hardware arrangement 900 and/or the device 800 including the hardware arrangement 900 to perform the method described above and any variations thereof under the condition that they are executed by the processor 906 in the arrangement 900.

Although the code means described above in connection with the embodiment disclosed in FIG. 9 is implemented as a computer program module, which is executed in the processor 906 such that the hardware arrangement 900 performs the method described above, at least one item of the code means may be at least partially embodied as a hardware circuit in an alternative embodiment.

The processor may be a single processing unit, but may also include two or more processing units. For example, the processor may include a general purpose microprocessor, an instruction set processor, and/or related chipsets and/or dedicated microprocessors (e.g., application specific integrated circuits (ASICs)). The processor may also include onboard memory for buffering purposes. The computer program may be carried by a computer program product connected to the processor. The computer program product may include a computer-readable medium on which a computer program is stored. For example, the computer program product may be a flash memory, a random access memory (RAM), a read only memory (ROM), an EEPROM, and the computer program module described above may be distributed to different computer program products in the form of a memory within the UE in an alternative embodiment.

It is to be noted that in the above description and the drawings, for the sake of description and convenience, all of angles α, θ use a plane angle, but in practice, the angle α, θ and the sum and/or difference between the two may be three-dimensional angle in the three-dimensional space.

While the present disclosure has been described with reference to the accompanying drawings, the embodiments disclosed in the drawings are intended to be illustrative of the embodiments of the present disclosure and are not to be construed as limiting the present disclosure.

While some embodiments of the present general inventive concept have been shown and described, those skilled in the art will appreciate that modifications may be made to these embodiments without departing from the principles and spirit of the present general inventive concept. The scope of the disclosure is defined by the claims and their equivalents.

What is claimed is:

1. A method for calculating a light field distribution in the process of generating a computer-generated hologram, comprising:

performing a three-dimensional modeling to an object for which a hologram is to be generated so as to obtain a three-dimensional model of the object;

determining a luminous characteristics of each voxel of the three-dimensional model at various azimuth angles within a viewing angle range of the hologram to be formed; and calculating a light field distribution of an object light wave of each voxel on a holographic plane based on the luminous characteristics of each voxel at various azimuth angles within the viewing angle range of the hologram to be formed, and wherein the light field distribution of the object light wave of each voxel on the holographic plane is represented by the complex amplitude of the object light wave of each voxel on the holographic plane, and the step of calculating a light field distribution of the object light wave of each voxel on the holographic plane based on the luminous characteristics of each voxel at various azimuth angles within the viewing angle range of the hologram to be formed comprises:

calculating the result of the complex amplitude of the object light wave of each voxel on the holographic plane weighted with the luminous characteristics of the corresponding voxel at various azimuth angles within the viewing angle range of the hologram to be formed, and wherein the light field distribution of the object light wave of a voxel on the holographic plane is calculated according to a formula as follow $$U(AP) = L(\theta) * \frac{a}{r} * \exp(ikr)$$

where U(AP) represents the complex amplitude of the object light wave of the voxel A at the point P on the holographic plane, θ represents the azimuth angle of the voxel A within the viewing angle range of the hologram to be formed, and L(θ) represents the luminous characteristics of the voxel A at the azimuth angle θ, α represents the initial amplitude of the object light wave of the voxel A, r represents the distance from the voxel A to the point P, and k represents the wave vector.

2. The method according to claim 1, wherein based on the established three-dimensional model, calculating the luminous characteristics of each voxel of the three-dimensional model at various azimuth angles within the viewing angle range of the hologram to be formed with a bidirectional reflection distribution function (BRDF);

or, under the condition that the object is made of a material whose physical mechanism of surface radiation is known, calculating the luminous characteristics of each voxel of the three-dimensional model of the object at various azimuth angles within the viewing angle range of the hologram to be formed with the known physical mechanism of surface radiation of the material;

or, determining the luminous characteristics of each voxel of the three-dimensional model of the object at various azimuth angles within the viewing angle range of the hologram to be formed by an actual measurement under the condition that the object is a solid three-dimensional model.

3. The method according to claim 2, wherein the luminous characteristics of a voxel of the three-dimensional model at various azimuth angles within a viewing angle range of the hologram to be formed is calculated according to a formula as follow $$L(\theta) = L_0 * \frac{BRDF(\theta + \alpha)}{BRDF(0)}$$

where θ represents the azimuth angle of the voxel within the viewing angle range of the hologram to be formed, α represents the azimuth angle of a light source within the viewing angle range of the hologram to be formed, and L(θ) represents the luminous characteristics of the voxel at the azimuth angle θ, $L_0$ represents the radiation intensity in the direction of the light source, BRDF(0) and BRDF(θ+α) represent the values in the reflection directions along the 0° and (θ+α) °calculated with the BRDF function.

4. The method according to claim 2, wherein the luminous characteristics of a voxel of the three-dimensional model of the object at various azimuth angles within the viewing angle range of the hologram to be formed is calculated according to the following formula under the condition that the object is made of a material whose physical mechanism of surface radiation is known $$L(\theta) = L_0 * \sqrt{\cos(\theta + \alpha)}$$

where θ represents the azimuth angle of the voxel within the viewing angle range of the hologram to be formed, α represents the azimuth angle of a light source within the viewing angle range of the hologram to be formed, and L(θ) represents the luminescence characteristic of the voxel at the azimuth angle θ, and $L_0$ represents the radiation intensity in the direction of the light source.

5. The method according to claim 2, wherein the luminous characteristics of a voxel of the object at various azimuth angles within the viewing angle range of the hologram to be formed is calculated according to the following formula by an actual measurement under the condition that the object is a solid three-dimensional model:

$$L(\theta) = \begin{cases} l_1, & \theta_0 < \theta < \theta_1 \\ l_2, & \theta_1 < \theta < \theta_2 \\ \ldots \\ l_n, & \theta_{n-1} < \theta < \theta_n \end{cases}$$

where θ represents the azimuth angle of the voxel within the viewing angle range of the hologram to be formed, L(θ) represents the luminous characteristic of the voxel at the azimuth angle θ, $\theta_0, \theta_1, \ldots \theta_{n-1}, \theta_n$ represent corresponding azimuth angles in each actual measurement, respectively, and $l_1, l_2, \ldots l_n$ represent luminous characteristic values obtained in each actual measurement, respectively.

6. The method according to claim 1, wherein the luminous characteristics of a voxel of the three-dimensional model at various azimuth angles within a viewing angle range of the hologram to be formed is calculated according to the magnitude of the complex amplitude of the light waves radiated from the voxel and the azimuth angle of the voxel within the viewing angle range of the hologram to be formed.

7. A method for generating a computer-generated hologram, comprising:
    a calculating step of calculating a light field distribution of an object light wave of each voxel of a three-dimensional model on a holographic plane formed by a plurality of pixels of a spatial light modulator according to the method according to claim 1;
    an encoding step of encoding the calculated light field distribution on the holographic plane into a transmittance variation of the hologram; and
    a mapping step of plotting a hologram with the transmittance variation of the hologram under the control of a computer.

8. An electronic device comprising a processor and a memory, wherein
    the memory is stored with instructions that cause the processor to perform the method according to claim 7 under the condition that the instructions are executed.

9. An electronic device comprising a processor and a memory, wherein the memory is stored with instructions that cause the processor to perform the method according to claim 1 under the condition that the instructions are executed.

10. A system for generating a computer-generated hologram comprising:
    a modeling module configured to perform a three-dimensional modeling to an object for which a hologram is to be generated to obtain a three-dimensional model of the object;
    a luminous characteristic determination module configured to determine the luminous characteristics of each voxel of the three-dimensional model at various azimuth angles within a viewing angle range of the hologram to be formed; and
    a light field distribution calculation module configured to calculate a light field distribution of an object light wave of each voxel on a holographic plane based on the luminous characteristics of each voxel at various azimuth angles within the viewing angle range of the hologram to be formed-,
    wherein the light field distribution of the object light wave of each voxel on the holographic place is represented by the complex amplitude of the object light wave of each voxel on the holographic plane, and the step of calculating a light field distribution of the object light wave of each voxel on the holographic plane based on the luminous characteristics of each voxel at various azimuth angels within the viewing angle range of the hologram to be formed comprises:
    calculating the result of the complex amplitude of the object light wave of each voxel on the holographic plane weighted with the luminous characteristics of the corresponding voxel at various azimuth angles within the viewing angle range of the hologram to be formed, and
    wherein the light field distribution of the object light wave of a voxel on the holographic plane is calculated according to a formula as follow $$U(AP) = L(\theta) * \frac{a}{r} * \exp(ikr)$$

where U(AP) represents the complex amplitude of the object light wave of the voxel A at the point P on the holographic plane, $\theta$ represents the azimuth angle of the voxel A within the viewing angle range of the hologram to be formed, and $L(\theta)$ represents the luminous characteristics of the voxel A at the azimuth angle $\theta$, $\alpha$ represents the initial amplitude of the object light wave of the voxel A, r represents the distance from the voxel A to the point P, and k represents the wave vector.

11. A system according claim 10, wherein the luminous characteristic determination module is specifically configured to based on the established three-dimensional model, calculate the luminous characteristics of each voxel of the three-dimensional model at various azimuth angles within the viewing angle range of the hologram to be formed with a bidirectional reflection distribution function (BRDF);

or, calculate the luminous characteristics of each voxel of the three-dimensional model of the object at various azimuth angles within the viewing angle range of the hologram to be formed with a mathematical model under the condition that the object is made of a material whose physical mechanism of surface radiation is known;

or, determine the luminous characteristics of each voxel of the three-dimensional model of the object at various azimuth angles within the viewing angle range of the hologram to be formed by an actual measurement under the condition that the object is a solid three-dimensional model.

12. The system according claim 10, wherein the luminous characteristic determination module is specifically configured to calculate the luminous characteristics of a voxel of the three-dimensional model at various azimuth angles within a viewing angle range of the hologram to be formed according to the magnitude of the complex amplitude of the light waves radiated from the voxel and the azimuth angle of the voxel within the viewing angle range of the hologram to be formed.

13. The system according claim 10, wherein the light field distribution calculation module is specifically configured to calculate the complex amplitude of the object light wave of each voxel on the holographic plane weighted with the luminous characteristics of the corresponding voxel at various azimuth angles within the viewing angle range of the hologram to be formed so as to obtain a light field distribution of the object light wave of each voxel on the holographic plane.

14. The system according claim 10, further comprising
an encoding module configured to encode the calculated light field distribution on the holographic plane into a transmittance variation of the hologram; and
a mapping module configured to plot a hologram with the transmittance variation of the hologram.

* * * * *